United States Patent [19]
Kihlberg

[11] 4,041,293
[45] Aug. 9, 1977

[54] METHOD OF MEASURING THE VELOCITY OF AN OBJECT RELATIVE TO A REFERENCE AND A DEVICE FOR EFFECTING SAID METHOD

[75] Inventor: Gunnar Axel Kihlberg, Sollentuna, Sweden

[73] Assignee: Jungner Instrument AB, Solna, Sweden

[21] Appl. No.: 615,932

[22] Filed: Sept. 23, 1975

[30] Foreign Application Priority Data

Sept. 25, 1974 Sweden .................................. 7412075

[51] Int. Cl.² .......................... G01P 3/42; G06G 7/19
[52] U.S. Cl. ................................ 235/151.32; 235/181; 324/175; 340/5 S; 343/8
[58] Field of Search ........................... 235/181, 151.32; 73/488; 340/3 R, 5 S; 324/161, 172, 175; 343/8

[56] References Cited
U.S. PATENT DOCUMENTS

| 3,689,157 | 9/1972 | Andermo | 324/175 |
| 3,777,133 | 12/1973 | Beck et al. | 235/181 |
| 3,804,517 | 4/1974 | Meyr et al. | 324/175 |
| 3,824,015 | 7/1974 | Petit et al. | 324/175 |
| 3,885,873 | 5/1975 | Andermo | 324/161 |
| 3,958,242 | 5/1976 | Sirven | 343/8 |
| 3,974,500 | 8/1976 | Goldfischer | 343/8 |

Primary Examiner—Felix D. Gruber
Attorney, Agent, or Firm—Flynn & Frishauf

[57] ABSTRACT

Method and apparatus for measuring the velocity of an object relative to a reference by means of signals that are transmitted and received by transmitters and receivers fixed to the object at a certain geometric distance from each other in the direction of measurement, signals being transmitted by the object and being reflected by the reference. The receivers set up signals which correspond to the auto-correlation and cross-correlation of the received signals, the correlation signals being functions of the transmitter-receiver system geometry and being substantially independent of the reflection properties of the reference. The auto-correlation and cross-correlation signals are operated on to determine a time shift therebetween which is a function of the displacement of the object over a given period of time, the velocity of the object relative to the reference location being determined from said time shift.

10 Claims, 21 Drawing Figures

Standardized autocorrelation AK for "white" noise $\tau = n\Delta t$

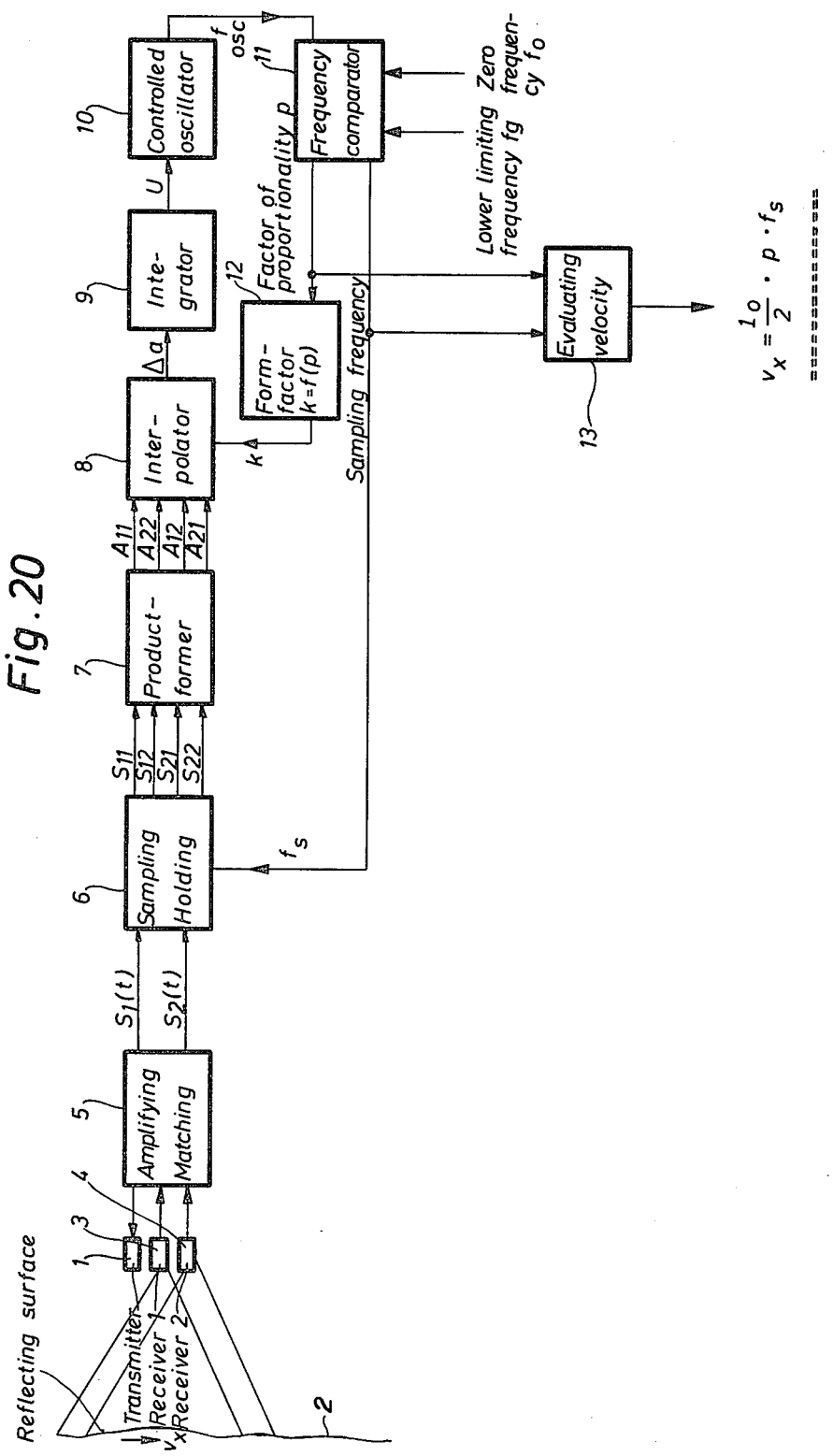

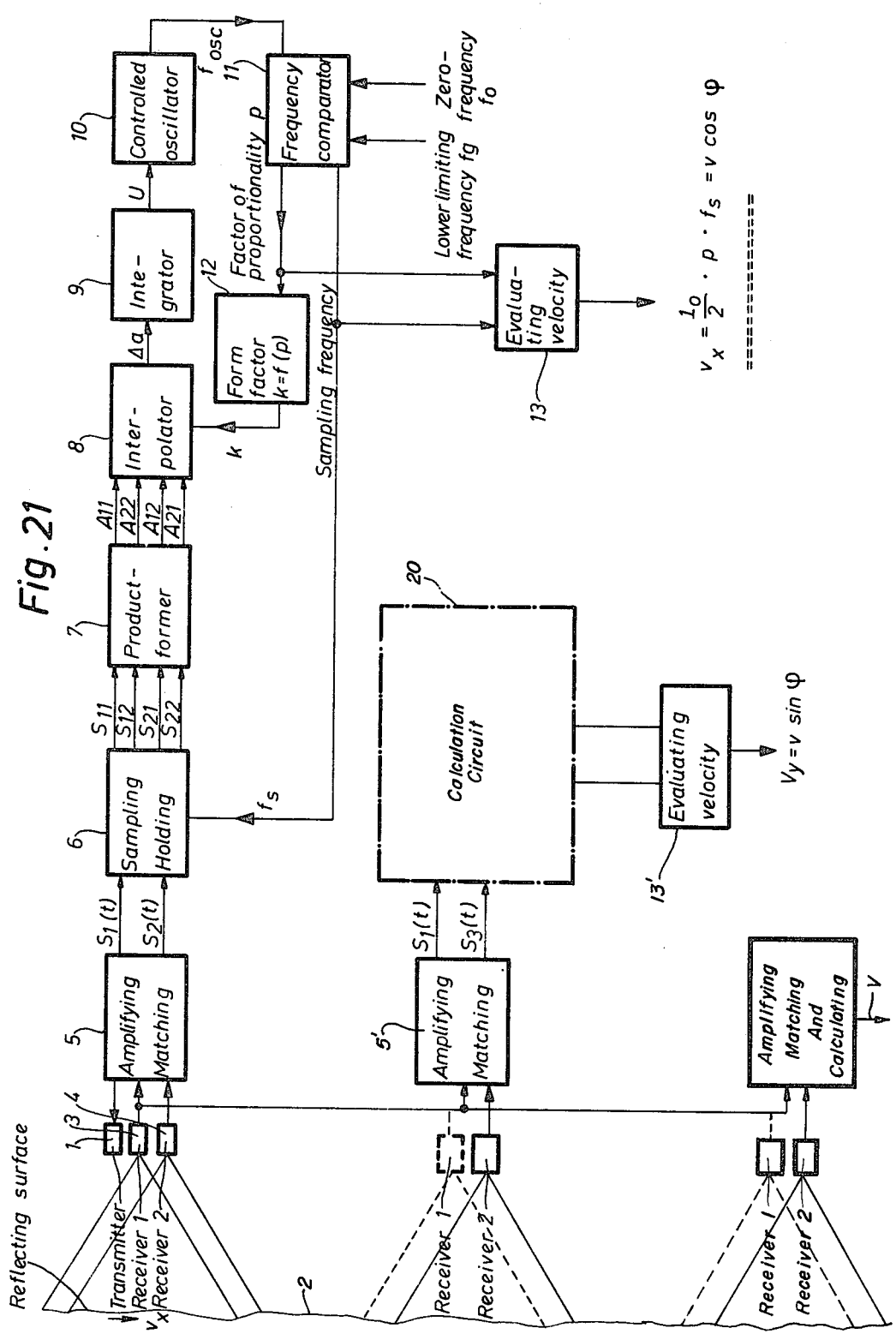

METHOD OF MEASURING THE VELOCITY OF AN OBJECT RELATIVE TO A REFERENCE AND A DEVICE FOR EFFECTING SAID METHOD

The present invention refers to a method of measuring the velocity of an object in relation to a reference, and a device for applying the method.

It is known previously how to measure the velocity of a ship relative to a reference by means of acoustic signals that are transmitted and received by transmitters and receivers arranged on board the ship in accordance with U.S. patent application No. 473,726.

According to said patent application, apparatus is provided to form the signals transmitted from the ship and those reflected by the reference into signals that are similar in character yet differ in time, the time lag being dependent on the distance in the direction of measurement between the receiving aerials and on the ship's velocity. The signals are compared and utilized in an indication device to develop a signal that depends upon the time lag between the two original signals.

The known device is founded basically on a method of measurement according to which a transmitter generates a coherent signal that is transmitted within a lobe area that is common in the main to at least one pair of receiving aerials, each receiving aerial of the pair being connected to a receiver, which implies that the signals reflected by the reference and received by the receivers are made up of reflections from every point on the reference within the lobe and that the resultant signal assumes an amplitude and a phase angle that are dependent on the reflexions from the entire lobe area. Each of the signals received is thus representative of the momentary position of each receiving aerial relative to the reference, and the signals are modulated, owing to the ship's motion relative to the reference.

The present invention, although based on the known method of measurement just outlined, differs from the techniques so far known in that the signals received by the receivers are treated quite differently from the treatment in the known device. The main purpose of the measuring device and method according to this invention is to measure velocities in the vicinity of zero with great accuracy. This cannot be realized by means of devices so far known.

According to one suitable design of the device of the present invention, incorporating two receiver systems mainly at right angles to each other, it is also possible to measure velocity components at arbitrary angles to the measuring direction. According to another embodiment of the invention, three receiving systems may be arranged into an equilateral triangle, thus producing a threephase indication of the velocity component to be measured.

BRIEF DESCRIPTION OF THE DRAWINGS

A few designs of the invention, which are selected as examples, will be described in certain detail below, reference being made to the accompanying drawings in which:

FIG. 20 shows a block diagram of a device according to the invention, and

FIG. 21 shows a block diagram of a device according to the invention, comprising two receiver systems at right angles to each other.

DETAILED DESCRIPTION

Figure 1:
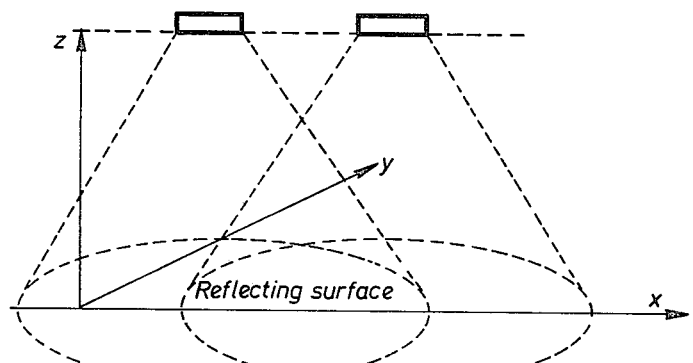
FIG. 1 shows a co-ordinate system comprising a transmitter and a receiver.

Suppose that in a transmitter-receiver system according to FIG. 1 the transmitter emits a stationary signal of a certain constant frequency, for instance in the form of a sound wave, which "illuminates" a reflecting surface. The "illumination" of this surface is determined by the distribution function of the transmitter lobe. Suppose, further, that the surface is irregular so that the reflections from the various surface elements will vary with a statistical independence of each other. (An area of the sea bottom "illuminated" by a sound wave of a constant frequency provides a good example of this.) A receiver collects signals that are reflected by the said surface in a manner that is determined by the lobe function of the receiver.

A system of co-ordinates $x, y, z$ is introduced, which is fixed relative to the reflecting surface. Let $x_T y_T z_T$ be co-ordinates of the transmitter and $x_R y_R z_R$ co-ordinates of the receiver and suppose the distance between the receiver and the transmitter to be small in relation to the distance to the reflecting surface. It can then be proved theoretically as well as experimentally that a stationary receiver S is obtained that is a single-valued function of the geometric means co-ordinates $$x_M = \frac{x_T + x_R}{2} ; y_M = \frac{y_T + y_R}{2} ; z_M = \frac{z_T + z_R}{2} ; \quad (1)$$

where $x_M, y_M, z_M$ is thus a point situated half-way between the transmitter and the receiver. If the transmitter is displaced a small distance $\xi$ in the $x$ direction, i.e., to the co-ordinate $x_T + \xi$ and the receiver at the same time the same distance $\xi$ in the opposite direction (to $x_R - \xi$), then $x_M$ will remain unchanged and so will the stationary signal S received. The same conditions apply to changes in the $y$ and $z$ directions. Hence, $S = S(x_M, y_M, z_M)$. So far only pure displacements have taken place and no turning of the transmitter and receiver has occurred. In other words, the angular orientation of the transmitter and receiver lobes has been retained.

In another transmitter - receiver system, in which the transmitter and receiver are rigidly connected with one another, the differences $x_T - x_R$, $y_T - y_R$ and $z_T - z_R$ remain unchanged. Shifts of this system are made relative to the reflecting surface, i.e., $x_M$, $y_M$, $z_M$ are changed. Since individual elements of the reflecting surface return the signal from the transmitter to the receiver statistically independently of each other, the signal $S(x_M, y_M, z_M)$ will be a so-called stochastic function of $x_M$, $y_M$ and $z_M$ (i.e., it will vary at random with these co-ordinates). This randomness of $S(x_M, y_M, z_M)$ depends (a) on the properties of the reflecting surface and (b) on the design of the transmitter - receiver system with respect to geometry and signal handling. The details of this dependence can be determined through measurement by elaborating the so-called auto-correlation of the signal $S(x_M, y_M, z_M)$. This involves a comparison of the signal $S(x_M, y_M z_M)$ and the displaced signal $S(x_M + \xi_M, y_M + \eta_M, z_M + \zeta_M)$ as shown below.

$$AC(\xi_M, \eta_M, \zeta_M) = \quad (2)$$

$$\int_{-\infty}^{\infty} dx_M \int_{-\infty}^{\infty} dy_M \int_{-\infty}^{\infty} S(x_M, y_M, z_M) S(x_M + \xi_M,$$

$$y_M + \eta_M, z_M + \zeta_M) dz_m$$

In many cases the standardized auto-correlation function (AC function)

$$AC_n(\xi_M, \eta_M, \zeta_M) = \frac{AC(\xi_M, \eta_M, \zeta_M)}{AC(O,O,O)} \quad (3)$$

is used, in which, owing to definition, $AC_n(O,O,O) = l$, which is the maximum value of $AC_n$.

Figure 2:
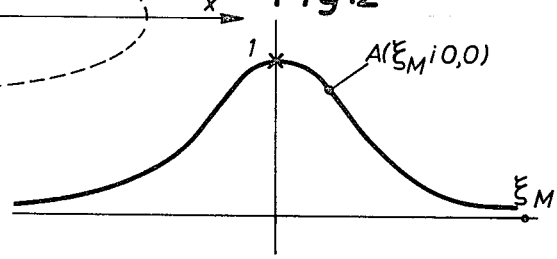
FIG. 2 shows a typical shape of the auto-correlation for the signal S.

A typical picture of $AC_n$ for instance in the $x$ direction, is shown in FIG. 2.

$AC_n$ can be measured by displacing the transmitter - receiver system in the $x$ direction and correlating the signal $S(x_M, y_M, z_M)$ with itself after a displacement of $\xi_M$.

What is interesting about the function $AC_n$ is that the geometry and signal handling of the transmitter - receiver system can be dimensioned in such a way that within generous limits the shape of the function $AC_n$ is almost entirely determined by these deterministically determined factors independent of the statistical properties of the reflecting surface.

Now let us consider two transmitter - receiver systems with identical properties but with their mean co-ordinates displaced in the $x$ direction:

$$\begin{cases} x_{M_2} = x_{M_1} - 1_o \\ y_{M_2} = y_{M_1} \\ z_{M_2} = z_{M_1} \end{cases} \quad (4)$$

which may be realized by using a common transmitter but two individual receivers, which are arranged at a displacement of $2 l_0$ in the $x$ direction. In this way two receiver signals are obtained, thus $$\begin{cases} S_1(x_{M_1}, y_{M_1}, z_{M_1}) = S(x, y, z) \\ S_2(x_{M_2}, y_{M_2}, z_{M_2}) = S(x - 1_o, y, z) \end{cases} \quad (5)$$

From these the following four correlation functions may be established:

(6)

$$\begin{cases} A_{11}(\xi, \eta, \zeta) = \iiint S_1(x, y, z) S_1(x + \xi, y + \eta, z + \zeta) dxdydz \\ \quad = \text{auto-correlation of } S_1 \\ A_{22}(\xi, \eta, \zeta) = \iiint S_2(x, y, z) S_2(x + \xi, y + \eta, z + \zeta) dxdydz \\ \quad = \text{auto-correlation of } S_2 \\ A_{12}(\xi, \eta, \zeta) = \iiint S_1(x, y, z) S_2(x + \xi, y + \eta, z + \zeta) dxdydz \\ \quad = \text{cross-correlation of } S_2 \text{ with } S_1 \text{ as reference} \\ A_{21}(\xi, \eta, \zeta) = \iiint S_2(x, y, z) S_1(x + \xi, y + \eta, z + \zeta) dxdydz \\ \quad = \text{cross-correlation of } S_1 \text{ with } S_2 \text{ as reference} \end{cases}$$

Owing to the identical properties of the two transmitter - receiver systems according to (5), it is possible to express (6) by means of (3), and therefore $$\begin{cases} A_{11}(\xi, \eta, \zeta) = A_{22}(\xi, \eta, \zeta) = AC(\xi, \eta, \zeta) \\ A_{12}(\xi, \eta, \zeta) = AC(\xi - 1_o, \eta, \zeta) \\ A_{21}(\xi, \eta, \zeta) = AC(\xi + 1_o, \eta, \zeta) \end{cases} \quad (7)$$

These expressions may be standardized according to (3) through division by $AC(O,O,O)$.

Figure 3:
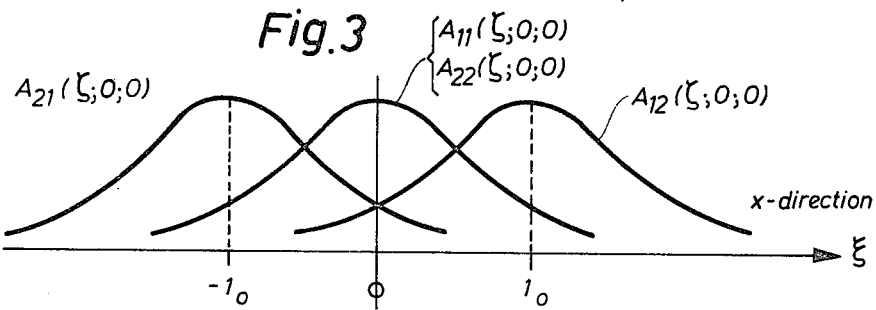
FIGS. 3, 4 and 5 show the shapes of the auto-correlation and cross-correlation functions in the x, y and z directions.
Figure 4:
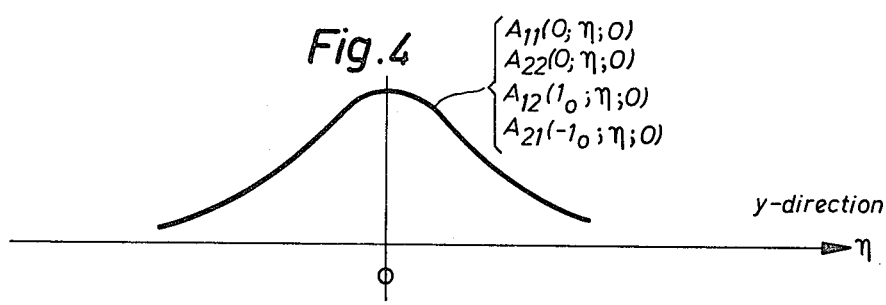
Figure 5:
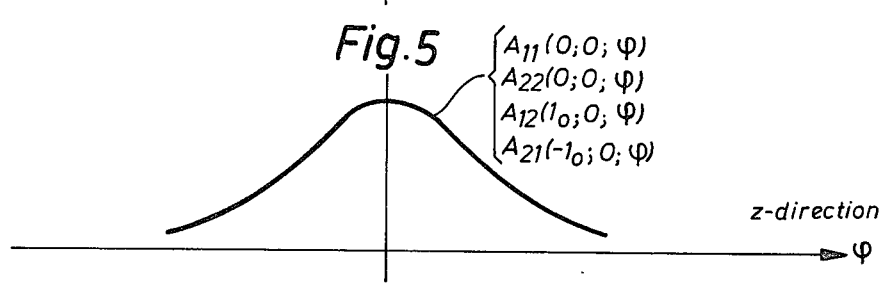

Typical characteristics of these functions in the $x$, $y$ and $z$ directions are shown in FIGS. 3, 4 and 5, respectively.

In the systems to be treated below, displacements in the $x$, $y$ directions will be considered and it will be shown how to determine the velocities of these displacements by means of the correlation functions in the said directions. It will be assumed for the sake of simplicity that the correlation functions have the same shape and extent in the $x$ and $y$ directions. In fact, this is the actual case when the transmitter and receiver elements are circular.

Figure 6:
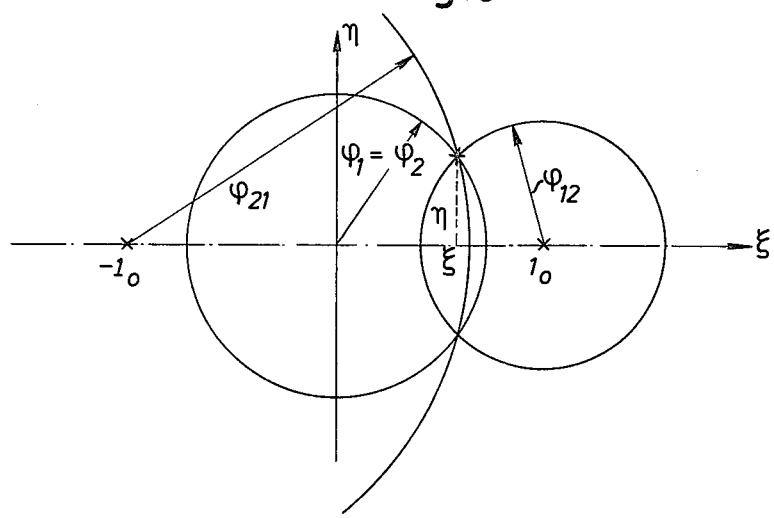
FIG. 6 shows the relations of the four correlation functions, using polar co-ordinates.

The relationships between the four correlation functions in the $x$, $y$ directions can then be illustrated by polar co-ordinates as shown in FIG. 6.

Corresponding to a certain displacement $(\xi, \eta)$ we can put (8)

$$\begin{cases} A_{11}(\xi, \eta, 0) = A(\zeta_1) \\ A_{22}(\xi, \eta, 0) = A(\zeta_2) \end{cases} \zeta_1 = \zeta_2 = \sqrt{\xi^2 + \eta^2} \\ A_{12}(\xi, \eta, 0) = A(\zeta_{12}); \zeta_{12} = \sqrt{(\xi - 1_o)^2 + \eta^2} \\ A_{21}(\xi, \eta, 0) = A(\zeta_{21}); \zeta_{21} = \sqrt{(\xi + 1_o)^2 + \eta^2} \end{cases}$$

Figure 7:
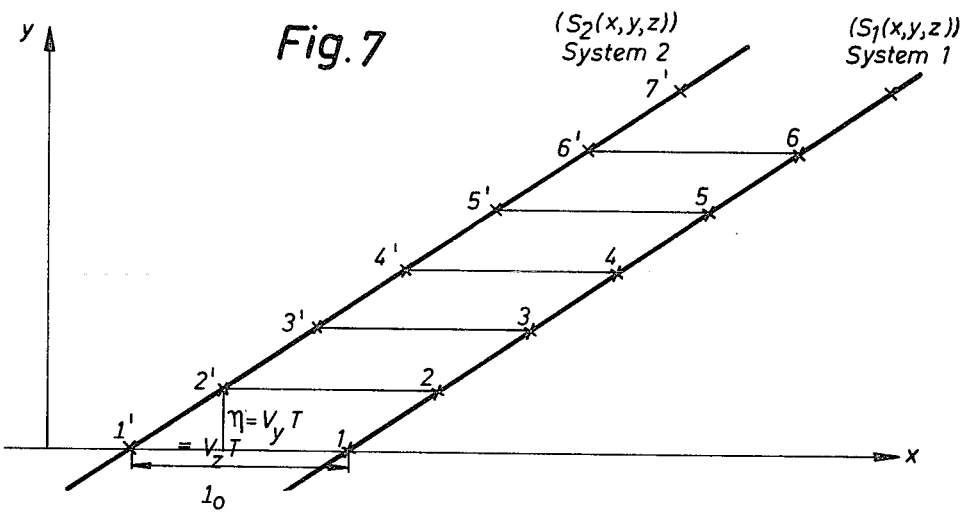
FIG. 7 shows the motion of two systems in the $x, y$ plane.

To illustrate what primary receiver signals $S_1(x, y, z)$ and $S_2(x, y, z)$ may correspond to, one may imagine the two measuring systems to be moving continuously at constant velocities $v_x$ and $v_y$ in the $x$, $y$ directions, thus displaying how the mean co-ordinates of the systems change in the course of such motion in the $x$, $y$ plane as can be seen from FIG. 7. In FIG. 7, pairs of positions carrying the same numbers, e.g. 1 and 1', are simultaneous but at a geometrical distance of $l_0$ in the $x$ direction.

The values of $S_1(x, y, z)$ and $S_2(x, y, z)$ at times $t_1, t_2, t_3 \ldots t_n$ are then measured and kept in mind, the "positions" 1, 2, 3 ... n and 1', 2', 3' ... n' of the measuring systems being arranged as in the Figure. Choosing time intervals so that $t_n - t_{n-1} = \text{constant} = \tau$ and $$\begin{cases} \xi = v_x(t_n - t_{n-1}) = v_x\tau \\ \eta = v_y(t_n - t_{n-1}) = v_y\tau \end{cases} \quad (9)$$

a constant geometrical displacement ($\xi$; $\eta$) in the $x$ and $y$ directions will be obtained between successive measured values of $S_1(x, y, z)$ and $S_2(x, y, z)$. If for the sake of simplicity these "sampled" data are denoted $S_1(t_n)$ and $S_2(t_n)$, respectively, the correlation functions according to (6) can be calculated from the sums $$A_{11}(\xi; \eta; 0) \triangleq \Sigma_{11} = \sum_n S_1(t_{n-1})S_1(t_n) \quad (10)$$

$$A_{22}(\xi; \eta; 0) \triangleq \Sigma_{22} = \sum_n S_2(t_{n-1})S_2(t_n)$$

$$A_{12}(\xi; \eta; 0) \triangleq \Sigma_{12} = \sum_n S_1(t_{n-1})S_2(t_n)$$

$$A_{21}(\xi; \eta; 0) \triangleq \Sigma_{21} = \sum_n S_2(t_{n-1})S_1(t_n)$$

Provided that the two measuring systems have been designed adequately the shapes of the correlation functions are known and it should be possible in principle to calculate $\xi$ and $\eta$ by means of the measured correlation sums $\Sigma_{11}$, $\Sigma_{22}$, $\Sigma_{12}$, and $\Sigma_{21}$, and, knowing $\tau$, subsequently also $v_x$ and $v_y$ by the relations $$\begin{cases} v_x = \dfrac{\xi}{\tau} \\ v_y = \dfrac{\eta}{\tau} \end{cases} \quad (11)$$

All the correlation functions above are, however, symmetrical with respect to $\eta$ and it is not possible to determine the sign of $\eta$ and, hence, of $v_y$.

The conventional and well-known method of measuring the velocity is to select a time lag $\tau$ that makes the cross-correlation $A_{12}(\xi;\eta;0) = A_{12}(\tau)$ maximum.

To facilitate finding this maximum one useful trick is to set the derivative $$\frac{\partial A_{12}(\tau)}{\partial \tau} = 0$$

by making the difference $$a(\tau + \Delta\tau) - A(\tau - \Delta\tau) = 0 \quad (12)$$

where $\Delta\tau$ results in a small time shift of $\tau$ in a positive or negative direction.

Considering the velocity in the $x$ direction only and assuming $v_y$ and, consequently, $\eta = 0$, it will be realized from the relation $A_{12}(\xi; 0; 0) = AC(\xi - l_0; 0; 0)$ that this maximum will occur when $\xi = l_0$ and that a positive velocity $v_x$ will be determined uniquely by $$v_x = l_0/\tau$$

where $l_0$ is the distance between the mean co-ordinates of the two measuring systems and $\tau$ denotes the set time lag.

In the case of negative velocities the maximum of $A_{21}(\xi; 0; 0) = AC(\xi - l_0; 0; 0)$ is used, which condition occurs when $\xi = -l_0$. Thus $$v_x = \frac{\xi}{\tau} = -\frac{l_0}{\tau}.$$

One difficulty is noticeable already at this stage in that with low velocities the time lag $\tau$ will have to be made big.

Supposing motion in both the $x$ and the $y$ directions at velocities $v_x$ and $v_y$, the value of $\tau$ that makes the cross-correlation $A_{12}(\xi; \eta; 0)$ or alternatively $A_{21}(\xi; \eta; 0)$ maximum will be dependent on how these functions vary in the $x$ and $y$ directions, and $v_y = \xi/\tau$ will be obtained only if the cross-correlation is almost completely independent of $\eta$. This condition would require very narrow transmitter and receiver lobes in the $y$ direction, i.e., a transmitter and a receiver of considerable length, which would be difficult to arrange and impractical to use.

Figure 8:
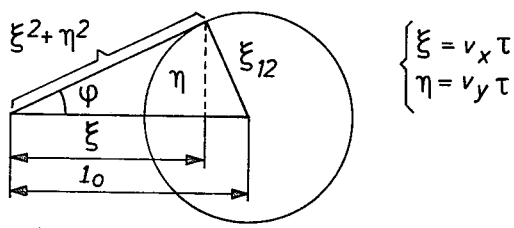
FIG. 8 shows a calculation of the maximum for circular systems according to FIG. 6.

It may be of interest to calculate the maximum of circular systems according to (8). The maximum here occurs when $\zeta_{12} = \sqrt{(\xi - l_0)^2 - \eta^2}$ is minimum (cf. FIG. 8). From FIG. 8 we have $$\frac{\sqrt{\xi^2 + \eta^2}}{l_0} = \frac{\xi}{\sqrt{\xi^2 + \eta^2}} \implies \frac{l_0}{\tau} = \frac{v_x^2 + v_y^2}{v_x} = \frac{v_x}{\cos^2 \zeta}$$

$l_0/\tau$ represents the measured velocity $v_{meas}$, and there is a strong influence by the velocity in the $y$ direction. This is a disadvantage especially when $v_x$ is small as compared to $v_y$.

The following description refers to a system with "overlapping" auto- and cross-correlations that will eliminate the said disadvantage: it only measures $v_x$. A time lag $\tau_0/2$ is selected so that the auto-correlation $A_{11}(\xi; \eta; 0)$ will equal the cross-correlation $A_{12}(\xi; \eta; 0)$, i.e., $$A_{11}(\xi; \eta; 0) - A_{12}(\xi; \eta; 0) = AC(\xi; \eta; 0) - AC(\xi - l_0; \eta; 0) = 0 \quad (13)$$

This occurs when $$\xi = \frac{l_0}{2} = v_x \cdot \frac{\tau_0}{2}, \text{ i.e., } v_x = \frac{l_0}{\tau_0}.$$

Figure 9:
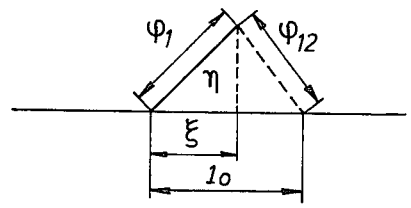
FIG. 9 shows the relation between vx and vy when the auto-correlation is as great as the cross-correlation.

These relations are illustrated geometrically in FIG. 9, in which $\zeta_1$ is the displacement corresponding to the auto-correlation $A_{11}$ and $\zeta_{12}$ is that corresponding to $A_{12}$.

Hence the immediate relation $v_x = l_0/\tau_0$ is independent of $v_y$! When the value of $v_x$ is negative, $\tau_0/2$ is chosen in such a way that $$A_{11}(\xi; \eta; 0) - A_{21}(\xi; \eta; 0) = AC(\xi; \eta; 0) - AC(l_0 + \xi; \eta; 0) = 0 \quad (14)$$

which gives $-\xi = l_0 + \xi$; $\xi = -l_0/2$ (note that $AC$ is a symmetrical function!)

$$v_x = -l_o/\tau_o$$

Earlier systems have also the disadvantage that $\tau_o$ is very big at low velocities, owing to the relation $v_x = l_o/\tau_o$. However, with the new system it is easy to include an interpolation that will eliminate this disadvantage. As stated above a time lag $\tau_o/2$ was chosen so that $$A_{11}(\xi; \eta; O) - A_{12}(\xi; \eta; O) = O \text{ for positive } v_x \text{ values}$$

and $$A_{11}(\xi; \eta; O) - A_{21}(\xi; \eta; O) = \text{is for negative } v_x \text{ values.}$$

Now, a time lag $O \leq \tau \leq \tau_o/2$ is selected, an interpolation function $k$ is included, and the values of $k$ and $\tau$ are fixed in such a way that $$(l - k) A_{11}(\xi; \eta; O) - A_{12}(\xi; \eta; O) - (l - k) A_{11}(\xi; \eta; O) - A_{21}(\xi; \eta; O) = O \quad (15)$$

a. With a positive $v_x$ and $\underline{k = l}$ the following special case occurs:

$$A_{11}(\xi; \eta; O) - A_{12}(\xi; \eta; O) = O, \text{ i.e., } \tau = \tau_o/2.$$

b. With a negative $v_x$ and $\underline{k = -l}$ the following special case occurs: $A_{11}(\xi; \eta; O) - A_{21}(\xi; \eta; O) = O$, i.e., $\tau = \tau_o/2$.

c. $\underline{k = O}$ results in the following special case:

$A_{12}(\xi; \eta; O) - A_{21}(\xi; \eta; O) = O$, or, if expressed in AC:

$AC(l_o - \xi; \eta; O) - AC(l_o + \xi; \eta; O) = O$, and so we get $$\xi = O \text{ and hence } v_x = \xi/\tau = O.$$

Other values of $k$; $-l < k - l$; can now be determined directly from (15). We have $$k = \frac{A_{12}(\xi; \eta; O) - A_{21}(\xi; \eta; O)}{2A_{11}(\xi; \eta; O) - A_{12}(\xi; \eta; O) - A_{21}(\xi; \eta; O)}$$
$$= \frac{AC(l_o - \xi; \eta; O) - AC(l_o + \xi; \eta; O)}{2AC(\xi; \eta; O) - AC(l_o - \xi; \eta; O) - AC(l_o + \xi; \eta; O)}$$

With two identical systems of measurement and with such a design that the shapes of the correlation functions are determined by the transmitter-receiver geometry and the signal handling, it will be realized that $k$ is a single-valued function of $\xi/l_o$, $\eta/l_o$. Hence $$k = k(\frac{\xi}{l_o}; \frac{\eta}{l_o}).$$

Further, since $k$ is a quotient of correlation functions the influence of $\eta/l_o$ will be almost negligible. With correlation functions of "Gaussian" shape $k$ is completely independent of $\eta/l_o$. Hence $k = k(\xi/l_o)$ is a quite permissible approximation.

Figure 10:
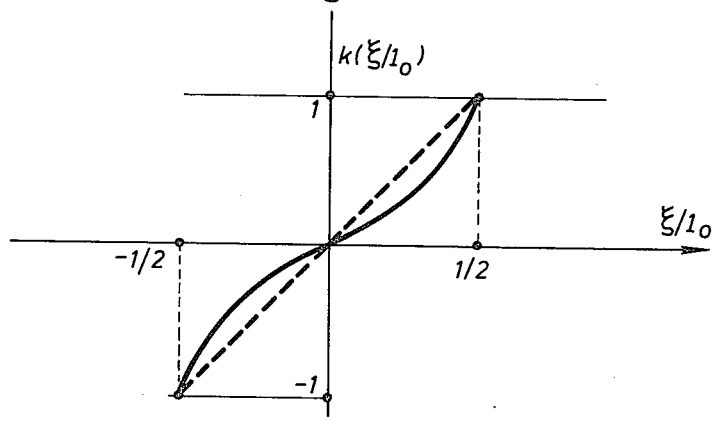
FIG. 10 shows the relation of the functions.

A characteristic appearance of $k(\xi/l_o)$ can be seen in FIG. 10. which may be used to illustrate a monotonous function of $\xi/l_o$. By measuring the value of k, and knowing the shape of $k(\xi/l_o)$, it is now possible uniquely to determine the value of $\xi/l_o$. We get $$v_x = \frac{\xi}{\tau} = \frac{\xi}{l_o} \cdot \frac{l_o}{\tau} \quad (16)$$

in which $l_o$ denotes the constant geometric displacement in the x direction between the mean co-ordinates in the two transmitter-receiver systems, and $\tau$ represents the time lag selected for the calculation of the correlation functions from signals $S_1(t)$ and $S_2(t)$.

Following this mathematical description, the signals $S_1(t)$ and $S_2(t)$ from the two measuring systems will now be subjected to a more direct approach. It is convenient to start with the case in which the two measuring systems are at a distance of $l_o$ from each other in the x direction and move at a velocity of $v_x$ in that direction. Owing to the stochastic nature of the reflecting surfaces. the signals will be of a random character. However, providing that the measuring systems are completely equivalent, the signals will have the same shape but will also have a time lag of $\tau_o = l_o/v_x$ in accordance with FIG. 11.

Signals $S_1(t)$ and $S_2(t)$ may be split into small signal elements along the time axis, each element being of duration $\Delta t$, for the purpose of studying their interrelationship. When the signals are of the type known as "white noise" each of these elements, for instance in $S_1(t)$ is independent statistically of the others. If these elements are numbered and their values denoted $d_n$ ($n = 1, 2, 3 \ldots$), it is found that the mean of the signal values is zero, following successive multiplication, for instance, $$\frac{d_1 d_2 + d_2 d_3 + d_3 d_4 + \ldots + d_n d_{n-1}}{n}.$$

Figure 12:
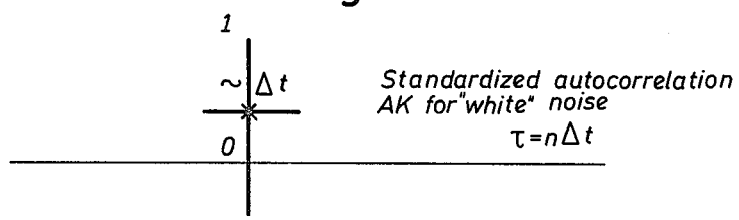
FIG. 12 shows the standardized auto-correlation at "white noise"

In this example the time difference between two multiplied signals is $\Delta t$. It would have been possible to choose another arbitrary time difference and still arrive at the product mean value 0, with the exception of time difference 0, i.e., the product sum $$\frac{d_1^2 + d_2^2 + d_3^2 + \ldots d_n^2}{n},$$

which $\neq O$ and in reality corresponds to the effective value of the signal. The product sums referred to in this context correspond to the auto-correlation signals $S_1(t)$ at time lag $n\Delta t$. Obviously, the result in the case of "white noise" is a very narrow auto-correlation. Cf. FIG. 12.

The product sums may be elaborated in many other ways, for instance by working out the product mean $$\frac{d_0 d_4 + d_4 d_8 + d_8 d_{12} + d_{12} d_{16} + \ldots d_{4n} d_{4n+4}}{n + 1}$$

to measure the AC at a time lag $4 t$, utilizing the sampled values $d_0, d_4, d_8, d_{12}, d_{16}$, etc., which is particularly convenient as only one previous value needs to be kept in mind, e.g., $d_4$ in the product $d_4 d_8$. The summation of the various product terms is often carried out by successively feeding the product values to a summation integrator.

The AC of signal $S_2(t)$ may be determined in a similar way, the elements being denoted $d'_1, d'_2 \ldots d'_n$, with $d'_n$ occuring simultaneously with $d_n$.

It is also possible to compare signals $S_1(t)$ and $S_2(t)$ by elaborating product sums of the type $$\frac{d_1 d'_1 + \gamma + d_2 d'_2 + \gamma + \ldots + d_n d'_{n+\gamma}}{n}$$

which provides a measure of the cross-correlation between $S_1(t)$ and $S_2(t)$ with a time lag of $\gamma \Delta t$ in $S_1(t)$. It would also have been possible to use the "simpler" product sum $$\frac{d_0 d''\gamma + d\gamma d''_2\gamma + d_2\gamma d'_3\gamma + \ldots + d_n\gamma d'_{(n+1)\gamma}}{n+1}$$

where at a successive summation of the product terms you need only remember one previous value of $d_n$, for instance $d_{2\gamma}$ in the case of the product $d'_{3y}$.

Figure 13:
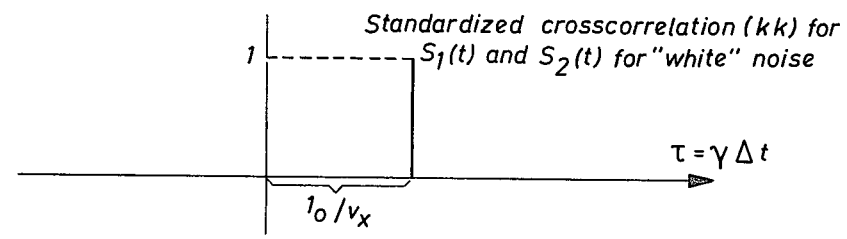
FIG. 13 shows the standardized cross-correlation of signals $S_1$ and $S_2$ at "white noise"

The cross-correlation between $S_1(t)$ and $S_2(t)$ in the case of "white noise" will deviate from 0 only if the time lag $\gamma\Delta t = \tau_o = l_o/v_x$. Cf. FIG. 13.

Figure 11:
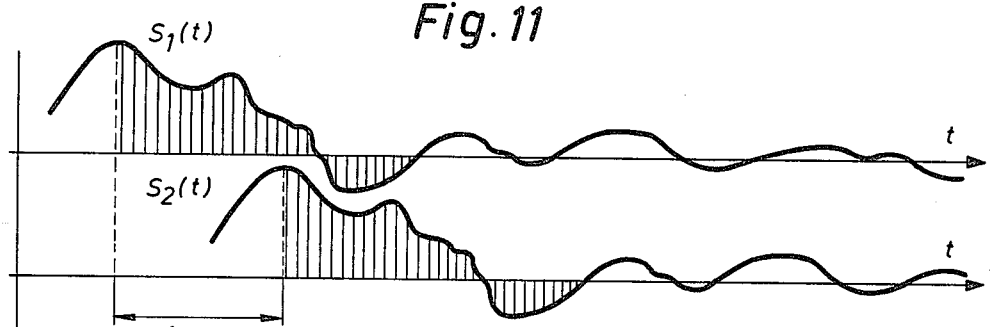
FIG. 11 shows signals $S_1$ and $S_2$.
Figure 14:
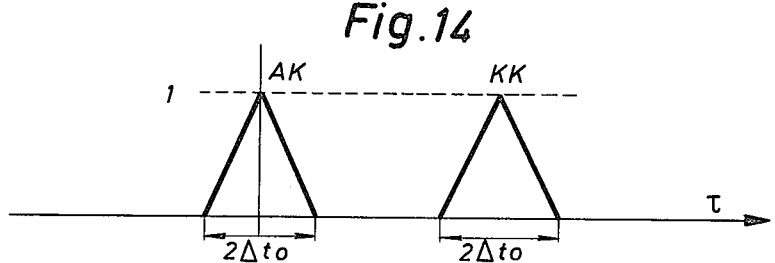
FIG. 14 shows the mean during each time element $\Delta t_0$ of the auto- and cross-correlations.

In FIGS. 11 and 12 the width and appearance of AC and CC have not been specified. It can, however, be proved that if the signal elements $d_1, d_2 \ldots d_n$ and $d'_1, d'_2 \ldots d'_n$ represent the mean during each time element $\Delta t_o$, then AC and CC will assume a triangular shape as shown in FIG. 14.

This formation of means of the signals prior to multiplication implies a type of low-pass filtration that cuts out the high frequencies of the "white noise". One way of widening the correlation function is thus to apply low-pass filtration with respect to time.

Figure 15:
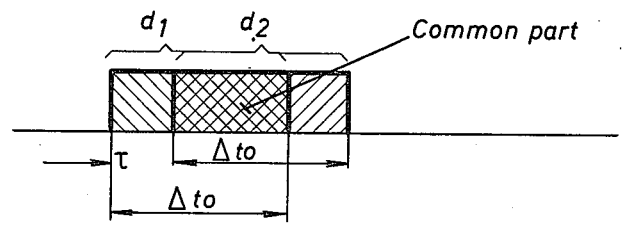
FIG. 15 shows the average common area.

The genesis of the triangular shape of AC will be easier to understand from FIG. 15, which shows how adjacent signal means "intertwine", producing an "average common area".

Now let us consider signals $S_1(t)$ and $S_2(t)$, following low-pass filtration or elaboration of successive means, corresponding to time $\Delta t_o$. If the time axis is again divided into small time elements $\Delta t$, which are smaller than $\Delta t_o$, adjacent signal elements, for instance in $S_1(t)$, will no longer be completely independent of each other since at each moment they have part of their origin in common: they are coherent in part, which implies that to some extent they do originate from the same source. The closer the two signal elements, the higher the degree of coherence. The auto-correlation provides a simple and useful measure of such coherence. In comparing the two signals $S_1(t)$ and $S_2(t)$ the corresponding measure is the cross-correlation.

It should be noted that the triangular shape of AC and CC that follows from this formation of means, is deterministic, i.e., uniquely determined by the signal handling and independent of any stochastic variations in the original source, the reflecting surface, provided that these variations possess the character of a sufficiently "white" noise, i.e., result in sufficiently fast variations primarily.

In the measuring system in question no formation of means in respect of time over a period $\Delta t_o$ is employed, however, since this would bring about the disadvantage of the formation of means in $S_1(t)$ and $S_2(t)$ becoming velocity-dependent. It would then be necessary to change $\Delta t_o$ inversely to the velocity $v_x$ to maintain the same width of AC and CC geometrically in the $x$ direction. Instead, use is made of the fact that the transmitter and receiver lobes possess such geometric properties that a geometric mean formation with a correspondingly wider shape of AC and CC is produced. Thus AC and CC will be determined purely geometrically and will not change their shape at variations in the velocity $v_x$. The formation of means is not of the "square" type produced in the example involving $\Delta t_o$ above but appears more "Gaussian". The "intertwining" of closely adjacent signal elements is illustrated by the way adjacent elements in FIG. 16 "intertwine". Here, the time axis is replaced by the $x$ axis ($\gamma = v_x t$) to stress the geometric relationship. Supposing that $d_1, d_2$, etc., are of "Gaussian" shape with the dispersion $\sigma_s = \sqrt{2} \cdot \sigma_s$. For CC, conditions are similar as can be seen from FIG. 17.

Figure 16:
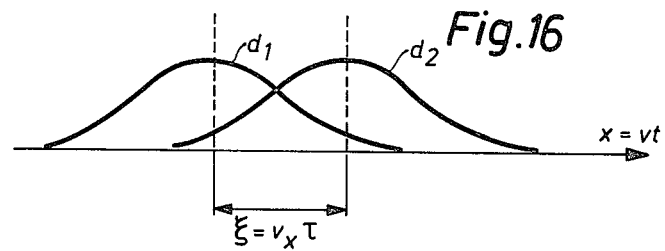
FIG. 16 shows the formation of a geometric mean of the shapes of the auto- and cross-correlations.
Figure 17:
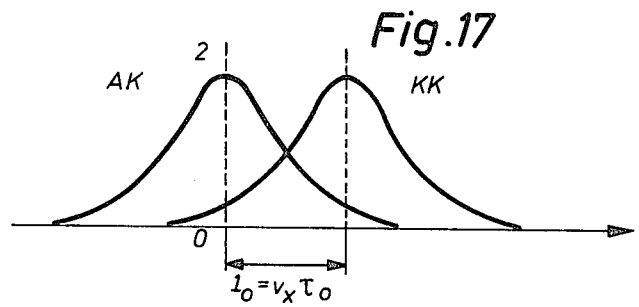
FIG. 17 shows the auto- and cross-correlations with a "Gaussian" dispersion.

The shape of AC is obtained from signals $d_1$ and $d_2$ in FIG. 16 by means of the integral ("product sum")

$$AC(\xi) = \int_{-\infty}^{\infty} d_1 d_2 dx.$$

Hence, here as well we have the interesting condition that the relationship between adjacent signals and, consequently, the shape of the auto-correlation function are deterministic and are not influenced by the stochastic properties of the reflecting surface as long as the said surface produces variations of sufficient velocity. The interpolation according to the invention is in fact made possible by this deterministic property of the auto- and cross-correlation.

A practical realization of the invention

For the following description of an uncomplicated embodiment of the invention, reference is made to the block diagrams of FIGS. 20 and 21 in which common elements are given the same reference numerals. Reference numeral 1 denotes the transmitter with its transmitter lobe whereas reference numeral 2 denotes the reflecting "stochastic" surface. Reference numerals 3 and 4 refer to the two receivers with their receiver lobes. The signals from receivers 3 and 4 are amplified, amplitude detected and matched to individual input stages 5. The output signals $S_1(t)$ and $S_2(t)$ are further processed in a sample and hold circuit 6. Here, the signals are sampled regularly at sampling frequency $f_s$, corresponding to a certain time lag $\tau$, each sampling providing a new value of current interest, $S_{12}$ for $S_1(t)$ and $S_{22}$ for $S_2(t)$, but also sampling values from the preceding sampling operation, $S_{11}$ for $S_1(t)$ and $S_{21}$ for $S_2(t)$. There is hence a time lag $\tau$ between values $S_{11}$ and $S_{12}$ and between values $S_{21}$ and $S_{22}$, which is determined by the sampling frequency in accordance to the relation $\tau = 1/f_s$. The values $S_{11}, S_{12}, S_{21}$, and $S_{22}$ are fed to the product generator 7. At each sampling occasion this instrument works out the products $a_{11}, a_{22}, a_{12}$, and $a_{21}$ in accordance with the following relations:

$a_{11} = S_{11} \times S_{12}$ corresponding to auto-correlation $S_1(t) * S_1(t+\tau)$ $a_{22} = S_{21} \times S_{22}$ corresponding to auto-correlation $S_2(t) * S_2(t+\tau)$ $a_{12} = S_{11} \times S_{22}$ corresponding to cross-corr. $S_1(t) * S_1(t) * S_2(t+\tau)$ $a_{21} = S_{21} \times S_{12}$ corresponding to cross-corr. $S_2(t) * S_1(t+\tau)$ Before these product terms are added in an integrator 9, product signals $a_{11}, a_{22}, a_{12}$, and $a_{21}$ are assembled in an interpolator stage 8 by means of an interpolation factor k, yielding a difference signal a in accordance with $$\Delta a = k(d_{11} + a_{22} - a_{12} - a_{21}) - a_{12} + a_{21}.$$

Figure 18:
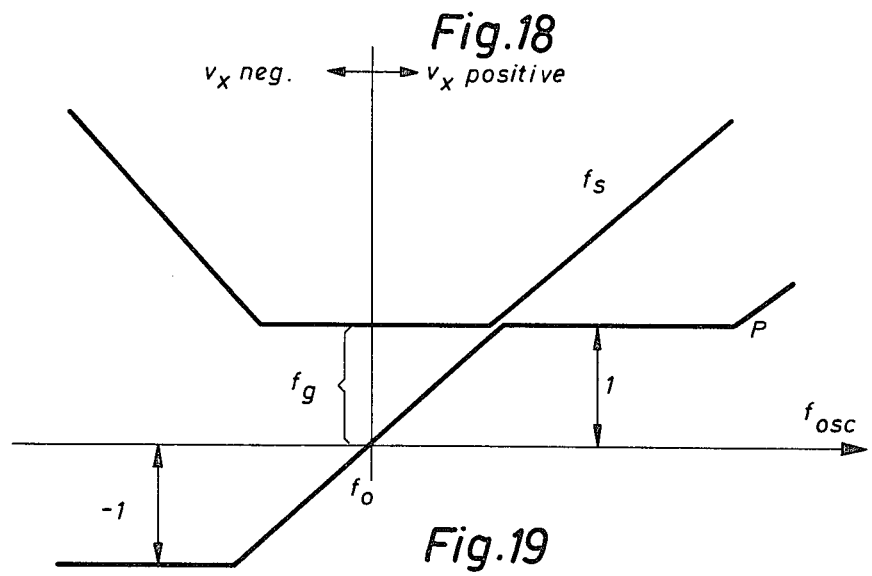
FIG. 18 shows frequency curves around velocity zero.

The output voltage U of the integrator 9 controls the output frequency $f_{osc}$ of an oscillator 10. This output frequency is digitally compared with the invariable or fixed clock frequencies $f_o$ and $f_g$ in a frequency comparator circuit 11 that produces two output signals, viz., the sampling frequency $f_s$ and a proportionality factor p in accordance with FIG. 18. The trick used her is to let $f_{osc}$ vary around a center frequency $f_o$; $f_{osc} = f_o$ when to $v_x = 0$. At positive $v_x$ values $f_{osc} > f_o$, at negative velocities (i.e., negative $v_x$ values) $f_{osc} < f_o$.

The difference frequency $f_{osc}$ ' $f_o$ is thus proportional to the velocity $v_x$. At high velocities the sampling frequency $f_s = f_{osc} - f_o$ is chosen for positive velocities and $f_s = f_o - f_{osc}$ for negative velocities, i.e., $f_s = |f_{osc} - f_o|$ (absolute value). Within a suitable velocity range around zero velocity a lower limit $f_g$ is allotted to $f_s$, the proportionality factor p here being determined by $f_{osc} - f_o = p.f_g$; p varies linearly together with the velocity $v_x$, assuming values between $-1$ and $+1$ in this range. In the range $f_s > f_g$, $p = 1$ at positive $v_x$ values and $-1$ at negative $v_x$ values.

Figure 19:
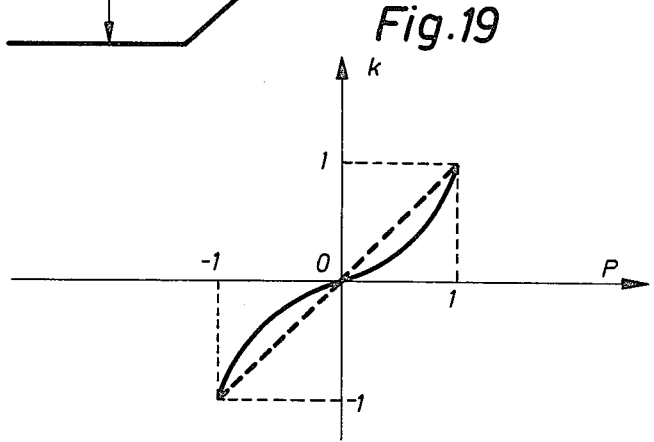
FIG. 19 shows a functional relation of p as a function of k.

Function $p$ is transformed into the interpolation factor $k$ by means of a shape factor block 12, consideration being given to any possible lack of linearity related to the shape of the correlation function (cf. FIG. 10). A typical functional relationship is shown in FIG. 19.

In this way $p$ will correspond to the quotient $2\mu/l_o$ as previously mentioned, in which $\xi = v_x\tau$. Since $\tau = 1/f_s$ we have $$v_x = \frac{\xi}{\tau} = \frac{l_o}{2} \cdot \frac{2\xi}{l_o} \cdot \frac{1}{\tau} = \frac{l_o}{2} \cdot p \cdot f_s$$

Hence, $v_x = \frac{l_o}{2} \cdot p \cdot f_s$ where $l_o$ is the distance between the mean co-ordinates of the two measuring systems.

The velocity is evaluated from $p$ and $f_s$ in an evaluation unit 13 in the form required, whether as a digital value, an analogue-electric voltage, or other suitable form.

It is easily realized that the above-mentioned device can be supplemented by another system of the two receivers that are arranged mainly at right angles to the first-mentioned system, such a system is shown in FIG. 21 with corresponding elements of the second system being designated by primed reference numerals. In FIG. 21, calculation circuit 20 includes elements 7–12 of FIG. 20. Using such an arrangement of FIG. 21 it is possible to measure the velocity vector of arbitrary direction in the system of co-ordinates that is defined by the two receiver system. Velocities $v_x$ and $v_y$ of these systems thus correspond in polar co-ordinates to $v \cos \phi$ and $v \sin \phi$ of an arbitrary velocity vector $\bar{v}$. The system of FIG. 21 operates the same as that of FIG. 20 and a detailed discussion thereof is therefore omitted. It is also possible to utilize three receiver systems, each comprising two receivers. In this case the receivers are arranged into an equilateral triangle. A symmetrical three-phase arrangement of this type offers the possibility of easy measurement of velocities in arbitrary directions relative to a reference direction.

I claim:

1. A method of measuring the velocity ($v$) of an object relative to a reference, comprising:
   transmitting signals from an object to a reflecting reference;
   receiving the signals at said object by at least two receivers and associated aerials fixed to said object, said receivers being fixed to said object at a given geometric distance ($l_o$) from each other in the measuring direction, the signals transmitted by said transmitters at said object and those reflected by said reference being similar signals but having a time shift ($\tau_o$) relative to each other, the size of said time shift ($\tau_o$) being a function of the geometric distance ($l_o$) between said receivers and of the velocity ($v$) of said object relative to said reference in accordance with $$l_o = v \cdot \tau_o;$$

said signals being stochastic functions of signals reflected by said reference with respect to the geometric displacement of said object relative to said reference;
   said signals further being transmitted by said transmitter within a lobe area that is substantially common to said aerials of said at least two receivers;
   generating signals ($A_{11}$, $A_{22}$ and $A_{12}$, and $A_{21}$) which correspond to the auto- and cross-correlations of the received signals such that the cross-correlation signals ($A_{12}$, $A_{21}$) are displaced by the distance $l_o$ relative to the auto-correlation signals ($A_{11}$, $A_{22}$), one cross-correlation signal being displaced in the positive direction of measurement, and the other auto-correlation signal being displaced in the negative direction of measurement, the correlation signals being functions of the transmitter-receiver system geometry and of the signal processing, and being substantially independent of the reflection properties of said reference, said auto- and cross-correlations of said signals having substantially the same shape;
   generating a ratio of the auto- and cross-correlation signals for a given time shift ($\tau$), where $\tau < \tau_o$ of the two signals received;
   interpolating said time shift to determine the displacement of said object corresponding to said given time shift; and
   calculating the velocity ($v$) of said object relative to said reference in accordance with the relation $v = l/\tau$.

2. Method according to claim 1, comprising selecting a time shift ($\tau$) equal to one-half of the time shift ($\tau_o$) between the two signals received, corresponding to the geometric displacement (l) where $l = l_o/2$, a positive displacement in the direction of measurement being accompanied by the difference between one cross-correlation ($A_{12}$) and one auto-correlation ($A_{11}$ or $A_{22}$) becoming zero and the velocity ($v$) becoming $1/\tau = l_o/\tau_o$, a negative displacement causing the difference between the other cross-correlation ($A_{21}$) and the other auto-correlation ($A_{11}$ or $A_{22}$) to become zero and the velocity ($v$) to become $-l/\tau = l_o/\tau_o$.

3. Method according to claim 2, comprising selecting shift ($\tau$) such that where $\tau \leq \tau_o/2$; selecting an interpolation factor ($k$) such that where $-l \leq k(l/l_o) \leq l$, $k$ being a function of the geometrical ratio $l/l_o$ in accordance with $$k\left(\frac{1}{l_o}\right) = \frac{A_{12}(l/l_o) - A_{21}(l/l_o)}{2A_{11}(l/l_o) - A_{12}(l/l_o) - A_{21}(l/l_o)};$$

and obtaining a relation by measuring correlation functions $A_{11}(l/l_o)$, $A_{12}(l/l_o)$ and $A_{21}(l/l_o)$; and then, knowing the shape of $k(l/l_o)$ for the measuring system in question, determining the ratio $l/l_o$ of the time shift ($\tau$) and hence also the velocity $v = l/\tau = l_o/\tau \cdot l/l_o$ as the product of $l/l_o$ and $l_o/\tau$.

4. Method according to claim 1, comprising selecting a time shift ($\tau$) such that where $\tau \leq \tau_o/2$; selecting an interpolation factor k such that where $-l \leq k(l/l_o) \leq l$, k being a function of the geometrical ratio $l/l_o$ in accordance with $$k(\frac{1}{1_o}) = \frac{A_{12}(1/1_o) - A_{21}(1/1_o)}{2A_{11}(1/1_o) - A_{12}(1/1_o) - A_{21}(1/1_o)};$$

and obtaining a relation by measuring the correlation functions $A_{11}(l/l_o)$, $A_{12}(l/l_o)$ and $A_{21}(l/l_o)$; and then, knowing the shape of $k(l/l_o)$ for the measuring systems in question, determining the ratio $l/l_o$ of the time shift ($\tau$) and hence also the velocity $v = 1/\tau \cdot l_o/\tau \cdot l/l_o$ as the product of $l/l_o$ and $l_o/\tau$.

5. Apparatus for measuring the velocity (v) of an object relative to a reference, comprising:
  at least one transmitter at said object for transmitting a signal to a reference;
  at least two receivers and associated aerials at said object for receiving the signals by said reference, said receivers being attached to said object at a given geometric distance ($l_o$) from each other in the measuring direction, said signals being transmitted by said transmitter within a lobe area that is substantially common to the at least two receiving aerials which are coupled to said receivers;
  means coupled to said transmitter and receivers for transforming the signals transmitted by said object and those reflected by said reference and received by said object into similar signals but with a time shift ($\tau_o$) between them, the size of said time shift ($\tau_o$) being a function of said geometric distance ($l_o$) between receivers and on the velocity (v) of the object relative to said reference in accordance with the relation $l_o = v \cdot \tau_o$, the resultant signals generated by said transforming means being stochastic functions of signals reflected by said reference with respect to the geometric displacement of said object relative to said reference;
  correlation means coupled to said transforming means for generating signals ($A_{11}$, $A_{22}$ and $A_{12}$, $A_{21}$) corresponding to the auto- and cross-correlations of the signals received by said receivers, said correlation signals being a function of the geometry of the transmitter-receiver system and of the signal processing and being substantially independent of the reflection properties of said reference, said auto- and cross-correlations of the signals having substantially identical shape yet with a displacement ($l_o$) of the cross-correlation signals ($A_{12}$, $A_{21}$) relative to the auto-correlation signals ($A_{11}$, $A_{22}$), one of the cross-correlation signals being displaced in the positive direction of measurement, and the other signal in the negative direction of measurement;
  means coupled to said correlation means for measuring the ratio of the auto- and cross-correlations for a certain time shift ($\tau$, where $\tau < T$) of the two signals received by said receivers;
  means coupled to said ratio measuring means for interpolating a geometric displacement (l, where $-l_o < l < +l_o$) corresponding to said time shift; and
  means coupled to said interpolation means for measuring the velocity (v) of said object relative to said reference in accordance with the relation $v = l/\tau$.

6. Apparatus according to claim 5, comprising two aerial systems, which are arranged substantially at right angles to each other, each aerial being connected to a respective receiver.

7. Apparatus according to claim 5, comprising three aerial systems, which are arranged substantially at 120° angles relative to each other, each aerial being connected to a respective receiver.

8. Apparatus according to claim 5, wherein said velocity measuring means comprises an integrator coupled to the output of said interpolation means; a controlled oscillator coupled to the output of said integrator and providing a signal having a frequency which is a function of the output of said integrator; a frequency comparator coupled to said controlled oscillator for comparing the frequency of the output from said controlled oscillator with at least one reference frequency; and means coupled to said frequency comparator for computing the velocity of said object as a function of the output of said frequency comparator.

9. Apparatus according to claim 8, further comprising a factor forming means coupled between the output of said frequency comparator and said interpolation means for providing said interpolation means with an interpolation factor.

10. Apparatus according to claim 5, comprising two aerical systems, which are arranged substantially at right angles to each other, each aerial being connected to a respective receiver and wherein the second of said two aerial systems comprises at least two furyher receivers with associated aerials; and transforming means, correlation means, ratio measuring means, interpolation means and measuring means interconnected to said at least two further receivers in the same manner as the corresponding elements are coupled to the first of said two aerial systems, said two systems measuring different components of the velocity of said object.

* * * * *